June 4, 1957    J. R. HOLLINS    2,794,968
MARKER SIGNAL LAMP
Filed Sept. 14, 1953
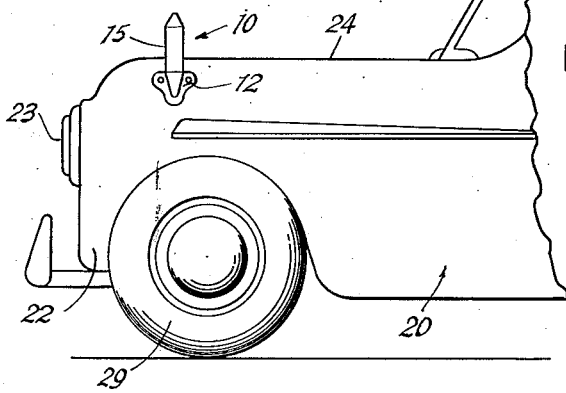
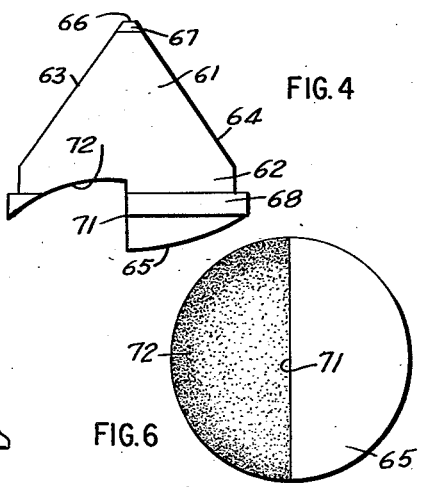
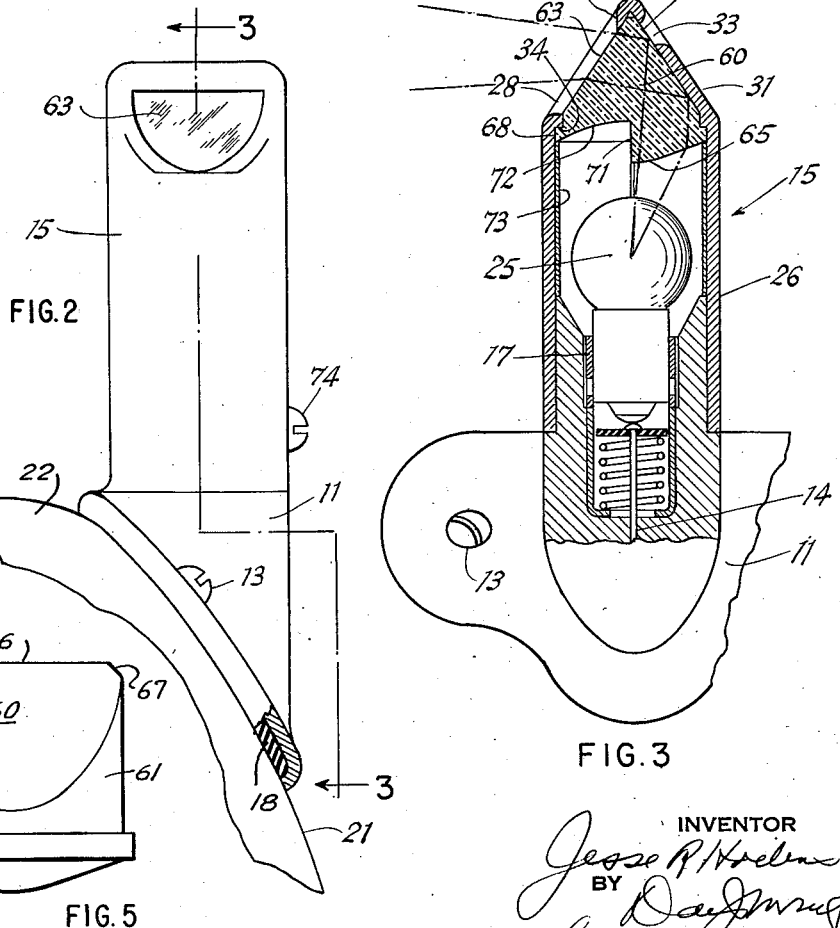
INVENTOR
Jesse R Hollins
BY
ATTORNEY

United States Patent Office 2,794,968
Patented June 4, 1957

2,794,968
MARKER SIGNAL LAMP

Jesse R. Hollins, Brooklyn, N. Y.

Application September 14, 1953, Serial No. 379,958

6 Claims. (Cl. 340—100)

This invention relates to vehicle headlamp circuit indicators and, more particularly, to a novel, fender mounted, headlamp beam position indicator.

The present invention is directed to a novel, fender-mounted, beam indicator lamp, particularly useful in the headlamp control and indicator system of my copending application Serial No. 295,268, filed June 24, 1952, for "Controls for Headlamp Switch," but also useful as a high beam indicator with the more usual headlamp control system, replacing the usual dash-mounted indicator or "pilot" lamp.

More specifically, the fender mounted lamp of the present invention is arranged to provide a relatively bright and clear light directed forwardly of the vehicle to service as a clearance marker for the driver of an approaching vehicle, and a rearwardly directed diffused and relatively soft "point" of light in the usual line of vision of the vehicle operator.

A single lamp bulb, mounted in a novel casing-shell cooperates with a novel prism lens with forwardly and rearwardly directed viewing aspects. The light rays from the lamp bulb directed forwardly from the prism enter the latter through a plain or polished surface or surfaces, and are transmitted thereby to provide a relatively sharp and clear light aspect to the driver of an approaching vehicle. The light rays from the lamp bulb directed rearwardly from the prism enter the latter through a sandblasted or etched surface of the prism, and exit through a small aperture or lens port in the form of a diffused or soft "point" of light in the driver's normal line of vision. The invention lamp is mounted on the outer side of the left fender, either above or slightly forward of the left wheel axis, and extends substantially above the fender.

For an understanding of the invention principles, reference is made to the following description of typical embodiments thereof as illustrated in the accompanying drawing.

In the drawing:

Fig. 1 is a partial left side elevation view of a motor vehicle equipped with the invention headlamp beam indicator;

Fig. 2 is an enlarged front elevational view of the indicator;

Fig. 3 is a sectional view of the indicator in a plane at right angles to that of Fig. 2; and Figs. 4, 5 and 6 are side and end elevation, and bottom plan, views, respectively of the prism.

Referring to Figs. 1 through 5, the headlamp beam indicator arrangement includes an indicator lamp 10 which is mounted on the outer substantially vertical surface 21 of the left front fender 22 of a vehicle 20, fender 22 also supporting the left headlamp 23. Lamp 10 extends substantially above the upper surface 24 of fender 22, and is vertically aligned with, or alternatively somewhat forward of the axle of left front wheel 29.

The indicator lamp includes a support 11 and a lamp housing or casing 15, the support being hollow and having a curved, rimmed flange 12, shaped to fit surface 21, and formed with holes for attaching bolts or screws 13. A gasket 18 is placed between surface 21 and flange 12, within the flange rim. A cable 14 enters housing 11 through a hole in surface 21 and an aperture in base 12 for the purpose of connecting the lamp in the headlamp energizing circuit. The upper end of housing 11 supports a bayonet type socket 17 receiving a vehicle lamp bulb 25. In practice, cable 14 and socket 17 form a unit which is inserted in support 11, the end of the cable conductor being joined to the headlamp circuit by a suitable connector.

Lamp housing 15 comprises a generally cylindrical or tubular body portion 26 and a prism shaped cap or top portion 27 whose longest dimension is laterally perpendicular to the length of vehicle 20. The top or cap portion 27 thus presents a forwardly directed face 28 and a rearwardly directed face 31. Forward face 28 has a semi-circular, relatively large aperture or lens port 32 therein, and rearward face 31 has a small diameter circular aperture or lens port 33 therein. For a purpose to be described, a square shoulder 34 projects inwardly at the junction of body 26 and cap 27, which preferably are integral with each other.

Cap portion 27 is arranged to seat a circular prism lens 60, best illustrated in Figs. 4, 5, and 6. Lens 60 comprises a prism portion 61 formed by cutting a cylinder 62 by intersecting planes whose vertex angle is bisected by an axial plane of the cylinder, thus forming semi-circular light ray exit surface 63 and a semi-circular light ray exit surface 64. The outer edge of portion 61 is truncated, as at 66, and terminates in bevelled corners 67.

Inwardly of surfaces 63, 64, cylinder 62 is formed with a circumferential, rectangular cross-section, rib 68 forming the base of a convex light admission surface 65. The lens is cut inwardly, along an axial plane bisecting the angle formed by surfaces 63, 64, from end surface 65, to form a surface 71. The lens is also cut, on a radius centered substantially inwardly of surface 65, from the intersection of rib 68 and surface 65 to surface 71, to form a concave light admission surface 72. For a purpose to be described, concave surface 72 is sand blasted and etched.

Lens 60 is seated in cap portion 27 with surface 63 adjacent relatively large aperture or lens port 32 in forward cap face 28, and surface 64 juxtaposed to rear cap face 31 with only a small circular portion of face 64 being exposed through small diameter aperture or lens port 33. In this position rib 68 seats against shoulder 34. Lens 60 is held in position by a longitudinally split spring sleeve 73 seated in body portion 26 with its outer edge engaged without 68. Sleeve 73 has a length such that, when housing 15 is assembled on base or support 11, the inner edge of sleeve 73 seats on the outer end of support 11, as best seen in Fig. 3. Housing 15 is secured in properly oriented position on support 11 by an attachment screw 74, lens port 32 facing forwardly and lens port 33 facing rearwardly.

When the lamp or bulb 25 is illuminated the light rays therefrom are directed through, respectively, either faces 65 or 72. The light rays passing through face 65 are transmitted generally so as to pass through the face 63 of the prism at lens port 32, and such light rays are relatively bright and clear for viewing as a marker by the approaching vehicle; the light rays directed outwardly through face 64 of the prism at the lens port 33 enter through the roughened or sand-blasted surface 72 and provide a diffused soft "point" or pencil of light in the vehicle driver's line of vision. Thus a sharp, clearly defined ray of light is provided through port 32 for observation and ascertainment of the left-most dimension of the vehicle by a driver coming from the opposite direction, thereby defining a marker, while the rays of light coming from the lens port 33 in the form of a diffused pencil or "point" of light is simultaneously visible to the driver of the vehicle for identifying the fact that the "low" beam headlights are in operation.

Lens 60 may be any desired transparent material, such as glass or "plastic," and may have a selected color such as red, green, yellow, or amber, yellow being preferred.

While specific embodiments of the invention have been shown and described in detail to illustrate the application of the invention principles, it should be understood that the invention may be otherwise embodied without departing from such principles.

What is claimed is:

1. An indicator lamp for mounting on the outer edge of the left front fender of an automotive vehicle in the normal line of sight of the driver, said indicator lamp comprising, in combination, an elongated upwardly extending casing having a closure cap portion on its upper end formed with a relatively small rearwardly directed lens port and a relatively large forwardly directed lens port; a lamp bulb mounted in said casing; and a single lens mounted in said cap portion in light receiving relation to said bulb and having light exit surfaces exposed through said lens ports; said lens being formed to transmit light from said light bulb to present a bright light aspect through said relatively larger lens port, and to present a diffused light aspect from said small lens port.

2. An indicator lamp for mounting on the outer edge of the left front fender of an automotive vehicle in the normal line of sight of the driver; said indicator lamp comprising, in combination, an elongated upwardly extending cylindrical casing having a prismatic closure cap portion on its upper end formed with a relatively small rearwardly directed lens port and a relatively large forwardly directed lens port; a lamp bulb mounted in said casing; and a single prismatic lens mounted in said cap portion and having a light entry surface exposed to said lamp bulb and light exit surfaces exposed through said lens ports.

3. An indicator lamp for mounting on the outer edge of the left front fender of an automotive vehicle in the normal line of sight of the driver; said indicator lamp comprising, in combination, an elongated upwardly extending cylindrical casing having a prismatic closure cap portion on its upper end formed with a relatively small rearwardly directed lens port and a relatively large forwardly directed lens port; a lamp bulb mounted in said casing; and a single prismatic lens mounted in said cap portion and having a light entry surface exposed to said lamp bulb and light exit surfaces exposed through said lens ports; the portion of said light entry surface receiving light directed toward said smaller lens port being roughened to scatter the light to present a diffused light aspect through said smaller lens port.

4. An indicator lamp for mounting on the outer edge of the left front fender of an automotive vehicle in the normal line of sight of the driver; said indicator lamp comprising, in combination, an elongated upwardly extending cylindrical casing having a prismatic closure cap portion on its upper end formed with a relatively small rearwardly directed lens port and a relatively large forwardly directed lens port; a lamp bulb mounted in said casing; and a prismatic lens mounted in said cap portion and having convex and concave light entry surfaces exposed to said lamp bulb and light exit surfaces exposed through said lens ports; the forward portion of said convex surface being cut away to provide a forwardly directed face in an axial plane intersected by the concave surface; said concave surface being roughened and said convex surface being polished, whereby a diffused light aspect is directed through said smaller lens port and a bright light aspect is directed through said larger lens port.

5. An indicator lamp for mounting on the outer edge of the left front fender of an automotive vehicle in the normal line of sight of the driver; said indicator lamp comprising, in combination, an elongated upwardly extending cylindrical casing having a prismatic closure cap portion on its upper end formed with a relatively small rearwardly directed lens port and a relatively large forwardly directed lens port; a lamp bulb socket mounted in said casing; a lamp bulb mounted in said socket; and a prismatic lens mounted in said cap portion and having convex and a concave light entry surfaces exposed to said lamp bulb and light exit surfaces exposed through said lens ports; the forward portion of said convex surface being cut away to provide a forwardly directed face in an axial plane intersected by the concave surface; said concave surface being roughened and said convex surface being polished, whereby a different light aspect is directed through said smaller lens port and a bight light aspect is directed through said larger lens port.

6. An indicator lamp as claimed in claim 5 in which said casing comprises a lamp mounting support mounting the lamp socket, an elongated housing formed with the cap portion, and a sleeve in said housing positioning the lens in said cap portion.

References Cited in the file of this patent

UNITED STATES PATENTS

| 1,213,505 | Lacerda | Jan. 23, 1917 |
| 1,909,072 | Prescott | May 16, 1933 |
| 1,909,077 | Schwarze | May 16, 1933 |
| 2,270,587 | Hall | Jan. 20, 1942 |
| 2,350,599 | Feldheim | June 6, 1944 |

FOREIGN PATENTS

| 814,790 | France | Mar. 22, 1937 |